(12) United States Patent
Beck et al.

(10) Patent No.: US 9,574,640 B2
(45) Date of Patent: Feb. 21, 2017

(54) TRANSMISSION FOR A MOTOR VEHICLE

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/646,639

(22) PCT Filed: Oct. 24, 2013

(86) PCT No.: PCT/EP2013/072222
§ 371 (c)(1),
(2) Date: May 21, 2015

(87) PCT Pub. No.: WO2014/079639
PCT Pub. Date: May 30, 2014

(65) Prior Publication Data
US 2015/0300459 A1    Oct. 22, 2015

(30) Foreign Application Priority Data
Nov. 21, 2012    (DE) .......................... 10 2012 221 241

(51) Int. Cl.
*F16H 3/56*    (2006.01)
*F16H 3/66*    (2006.01)

(52) U.S. Cl.
CPC .......... *F16H 3/66* (2013.01); *F16H 2200/0008* (2013.01); *F16H 2200/0069* (2013.01); *F16H 2200/201* (2013.01); *F16H 2200/2046* (2013.01)

(58) Field of Classification Search
CPC ...................................................... F16H 3/66
See application file for complete search history.

(56) References Cited

U.S. PATENT DOCUMENTS

| 6,997,844 B2 | 2/2006 | Bucknor et al. |
| 7,074,153 B2 | 7/2006 | Usoro et al. |

(Continued)

OTHER PUBLICATIONS

PCT Search Report and Written Opinion, Jan. 28, 2014.
German Patent Office Search Report, Jul. 16, 2013.

*Primary Examiner* — Derek D Knight
(74) *Attorney, Agent, or Firm* — Dority & Manning, P.A.

(57) ABSTRACT

A transmission for motor vehicles includes a drive shaft; an output shaft; a housing (GE); six shift elements in the form of a first brake (B1) and a second brake (B2) along with a first clutch (K1), a second clutch (K2, K2', K2", K2''', K2''''), a third clutch (K3) and a fourth clutch (K4, K4'); a first planetary gear set (PR1), a second planetary gear set (PR2) and a third planetary gear set (PR3). The shift elements are selectively actuated, by which ten forward gears and one reverse gear can be realized through different transmission ratio relationships between the drive shaft and the drive shaft. The drive shaft and the output shaft are arranged in a manner axially offset to each other and the drive shaft is connectable to a planetary carrier (PT1) of the first planetary gear set (PR1) through the third clutch (K3) and the planetary carrier (PT1) of the first planetary gear set (PR1) is connectable to the housing (GE) by means of the second brake (B2).

11 Claims, 8 Drawing Sheets

(56) References Cited

U.S. PATENT DOCUMENTS

| | | |
|---|---|---|
| 7,086,986 B2 | 8/2006 | Raghavan et al. |
| 7,090,610 B2 | 8/2006 | Usoro et al. |
| 7,150,695 B2 | 12/2006 | Usoro et al. |
| 7,736,258 B2 | 6/2010 | Wittkopp et al. |
| 7,828,688 B2 | 11/2010 | Phillips et al. |
| 8,409,045 B1 * | 4/2013 | Mellet .................. F16H 3/66 |
| | | 475/280 |
| 2005/0181906 A1 | 8/2005 | Park |
| 2009/0305837 A1 | 12/2009 | Hiraiwa |
| 2010/0035718 A1 | 2/2010 | Saitoh |
| 2012/0094799 A1 | 4/2012 | Phillips |

\* cited by examiner

| Gear | Brake | | Clutch | | | | Ratio |
|---|---|---|---|---|---|---|---|
| | B1 | B2 | K1 | K2 | K3 | K4 | |
| 1 | | X | X | X | | | 5,831 |
| 2 | X | X | | X | | | 3,834 |
| 3 | | X | | X | | X | 2,827 |
| 4 | X | | | X | | X | 1,926 |
| 5 | | | X | X | | X | 1,474 |
| 6 | | | | X | X | X | 1,131 |
| 7 | | | X | X | X | | 1,000 |
| 8 | X | | | X | X | | 0,918 |
| 9 | | | X | | X | X | 0,755 |
| 10 | X | | | | X | X | 0,601 |
| R | | X | X | | | X | -2,945 |

Fig. 8

TRANSMISSION FOR A MOTOR VEHICLE

FIELD OF THE INVENTION

The present invention relates to a transmission, in particular for use in motor vehicles.

BACKGROUND

Here, a transmission in particular designates a multi-gear transmission, with which a predefined number of gears, thus fixed transmission ratio relationships between transmission input and transmission output, is automatically shiftable through shift elements. Here, the shift elements comprise, for example, clutches or brakes.

DE 10 2008 032 015 discloses a powershift transmission with ten forward gears and one reverse gear. Thereby, the powershift transmission features three planetary gear sets, which are able to be shifted with each other in various combinations through six torque-transferring devices, two of which are fixed connections and four of which are clutches. A torque is initiated through a start-up element in the powershift transmission, and is transferred to an output element while taking into account the respective transmission ratio relationship. Thereby, the drive element and the output element are arranged coaxially to each other.

SUMMARY OF THE INVENTION

The present invention is subject to a task of proposing a transmission of the aforementioned type, which features small gear steps with a large gear spread, which at the same type optimizes installation space and features a high degree of efficiency. Additional objects and advantages of the invention will be set forth in part in the following description, or may be obvious from the description, or may be learned through practice of the invention.

A "gear spread" is understood to mean the quotient from the transmission ratio relationship of the lowest gear and the transmission ratio relationship of the highest gear, whereas the lowest gear features the largest transmission ratio relationship, and the highest gear preferably features the smallest transmission ratio relationship. If there is a transmission ratio relationship of i<1.0, a transmission ratio into fast mode takes place; that is, at the transmission output, a higher rotational speed than that at the transmission input is applied.

In accordance with the invention, the task is solved with a transmission as described and claimed herein.

The transmission comprises at least one drive shaft, one output shaft, one housing and six shift elements. It is particularly preferable that, through the drive shaft, a torque or a rotational movement of a drive source, such as an internal combustion engine, is initiated in the transmission. In a preferred manner, a start-up element, such as a hydrodynamic torque converter or a fluid coupling, is located between the drive source and the drive shaft.

In the following, a "shaft" is not solely understood as an exemplary cylindrical, rotatably mounted machine element for the transfer of torques, but is also understood as a general connection element, which connects individual components or elements to each other.

It is particularly preferable that the six shift elements comprise a first brake, a second brake, a first clutch, a second clutch, a third clutch and a fourth clutch.

Thereby, clutches describe shift elements that, depending on their operating state, allow for a relative movement between two components or represent a fixed connection for the transfer of a torque. A "relative motion" is understood as, for example, a rotation of two components, where the rotational speed of the first component and the rotational speed of the second component differ from each other. In addition, the rotation of only one of the two components is conceivable, while the other component is at a standstill or rotates in the opposite direction.

In the following, a "non-actuated clutch" is understood as an open clutch. This means that a relative motion between the two components is possible. With an actuated or locked clutch, the two components rotate accordingly with the same rotational speed and in the same direction.

A "brake" is understood as a shift element that is connected on one side to a fixed element, such as a housing, and on another side to a rotating element. In the following, a "non-actuated brake" is understood as an open brake. This means that the rotating component is in free-running mode, which means that the brake preferably does not affect the rotational speed of the rotating component. With an actuated or locked break, a reduction of the rotational speed of the rotating component up to a stop takes place, which means that a fixed connection between the rotating element and the fixed element can be established.

As a general rule, the use of shift elements that are locked in a non-actuated state and open in an actuated state is also possible. Accordingly, the allocations between function and shifting state of the shifting states described above are understood in reverse order. With the following embodiments, an arrangement in which an actuated shift element is closed and a non-actuated shift element is open is initially used as the basis.

The transmission also comprises a first planetary gear set, a second planetary gear set and a third planetary gear set.

Thereby, a planetary gear set comprises a sun gear, a planetary carrier and a ring gear. Planetary gears that mesh with the toothing of the ring gear and/or with the toothing of the sun gear are rotatably mounted on the planetary carrier. In the following, a negative planetary gear set describes an individual planetary gear set with a planetary carrier on which the planetary gears are rotatably mounted, with a sun gear and a ring gear, whereas the toothing of at least one of the planetary gears meshes with both the toothing of the sun gear and with the toothing of the ring gear, by which the ring gear and the sun gear rotate in opposite directions, if the sun gear rotates with a fixed planetary carrier. A particularly compact transmission can be realized through the use of planetary gear sets, by which a high degree of freedom in the arrangement of the transmission is achieved.

In particular, the sun gear, the ring gear, the planetary carrier and the planetary gears of the planetary gear set are understood as elements of a planetary gear set.

It is particularly preferable that the shift elements are able to be actuated selectively, thus individually, by which ten forward gears and one reverse gear can be realized through different transmission ratio relationships between the drive shaft and the output shaft. Based on the numerous gears, it is possible to realize a fine gear shifting with a large gear spread, and thereby, for example, to operate the internal combustion engine in an optimal rotational speed range, and thus efficiently. Thus, for example, noise emissions that arise through the operation of the internal combustion engine are reduced.

It is also preferable that the drive shaft and the output shaft are arranged in a manner axially offset to each other. This leads, for example, to a particularly low need for axial installation space for the transmission. Thereby, the transmission is suitable, in a particularly preferable manner, for use in a vehicle with a front-transverse arrangement of the drive train.

"Front-transverse arrangement of the drive train" is understood to mean that the drive source, such as an internal combustion engine, is installed in the vehicle transverse to the direction of travel, and that, preferably, the wheels of the front axle are drivable by the drive source or the transmission.

It is also preferable that the drive shaft is connectable to a planetary carrier of the first planetary gear set through the third clutch, and the planetary carrier of the first planetary gear set is connectable to the housing by means of the second brake. This achieves a multitude of degrees of freedom with respect to the planetary gear sets, such that a high number of gears with the use of relatively few shift elements and planetary gear sets is feasible.

It is particularly preferable that all elements of the first planetary gear set, the second planetary gear set and the third planetary gear set are rotatable. This means that there is no permanent connection between the elements of the planetary gear sets and the housing; rather, this can be selectively produced by actuating the shift elements. This also advantageously contributes to the fact that, by means of a low number of planetary gear sets, a high number of gears can be realized.

The degree of efficiency of the transmission may be preferably increased by the fact that, for the shift elements, energy is necessary for the change to the shifting state, but not for maintaining the shifting state itself. Here, actuated shift elements in line with demand, such as electromechanical shift elements or electromagnetic shift elements, are suitable in a particular way. Particularly when compared to conventional hydraulically actuated shift elements, they are characterized by a particularly low and efficient energy demand, since they can be operated nearly loss-free. In addition, with the solution specified above, it is advantageous that permanently holding a control pressure for the actuation of the (for example) conventional hydraulic shift elements, and/or permanently applying the shift element in the locked state with the required hydraulic pressure, can be avoided. Thereby, additional components such as a hydraulic pump (for example) may be omitted, to the extent that they are solely used for the control and supply of conventional hydraulically actuated shift elements. If the additional components are supplied with lubricant by the same hydraulic pump, and not by a separate lubrication pump, at least this can be dimensioned smaller. Moreover, any leaks at the oil transfer points of the hydraulic circuit that may arise, particularly with rotating components, are eliminated. It is particularly preferable that this also contributes to increased efficiency of the transmission in the form of a higher degree of efficiency. Upon the use of actuated shift elements in line with demand of the type specified above, it is particularly advantageous if they are accessible from the outside. Among other things, that has the advantage that the required shifting energy can be easily fed to the shift elements. Therefore, the shift elements are, particularly preferably, arranged so that they are easily accessible from the outside. Within the meaning of the shift elements, "easily accessible from the outside" means that no additional components are arranged between the housing and the shift element, and/or that the shift elements are, particularly preferably, arranged on the output shaft or on the drive shaft.

A transmission input thereby describes the location on a transmission at which, in driving mode, a torque is initiated by the drive source in the transmission. In contrast to this, a "transmission output" is understood to mean the location on the transmission at which the torque, taking into account the corresponding transmission ratio relationships (for example, in a transfer case) is initiated or transferred to the drive shafts of the vehicle.

It is particularly preferable that the first planetary gear set, the second planetary gear set and the third planetary gear set are designed as negative planetary gear sets. It is also preferable that all elements of the planetary gear sets are rotatable. This means that there is no permanent connection to a fixed element, such as the housing. Thereby, a blocking of the individual elements of the planetary gear sets takes place only through the actuation of the respective shift elements.

In an additional preferred embodiment, the transmission features a first spur pinion and a second spur pinion. By means of the first spur pinion and the second spur pinion, a torque is transferable to the output shaft, depending on the actuation of the shift elements. Through this arrangement, the transmission is suitable, in a particularly preferable manner, for use in vehicles with a front-transverse arrangement of the drive train, since a lower need for axial installation space is required by the axially offset arrangement of the drive shaft and the output shaft. This is of particular importance for vehicles with a front-transverse arrangement of the drive train, since the available installation space for the drive source and the transmission is, in a particular manner, limited by the width of the vehicle. However, other arrangements of the drive train (for example, for rear-wheel drive vehicles) are conceivable.

A spur pinion comprises a single-stage or multi-stage spur gearbox with at least two spur gears, which mesh with each other. Thereby, the respective shafts of the spur gears are arranged parallel to each other.

The two spur pinions are arranged, beginning at the transmission input, coaxially to the drive shaft between the first planetary gear set and the second planetary gear set, in the order of first spur pinion, second spur pinion. This arrangement provides a space-saving design. This is because the individual planetary gear sets and shift elements can be easily nested in one another, since, for example, the various shafts with this arrangement do not cross each other.

In an additional preferred embodiment, the drive shaft is connectable to the first brake and the sun gear of the first planetary gear set by means of the first clutch, and the sun gear of the first planetary gear set is connectable to the housing by means of the first brake.

It is also preferable that the drive shaft is connectable to the sun gear of the third planetary gear set through the second clutch and to the ring gear of the third planetary gear set through the third clutch. It is also preferable that the ring gear of the first planetary gear set is connected to a first spur pinion and the sun gear of the second planetary gear set. It is also preferable that the first spur pinion is connectable to the output shaft through the fourth clutch. The planetary carrier of the second planetary gear set is connected to a second spur pinion, and this is connected to the output shaft. The ring gear of the second planetary gear set is further connected to the planetary carrier of the third planetary gear set.

In an additional preferred embodiment, the drive shaft is connected to the sun gear of the third planetary gear set and is further connectable to the ring gear of the third planetary gear set through the second clutch. The ring gear of the first planetary gear set is connected to a first spur pinion and the sun gear of the second planetary gear set, and the first spur pinion is connectable to the output shaft through the fourth clutch. A second spur pinion is connected, on the one hand, preferably to the planetary carrier of the second planetary gear set and, on the other hand, to the output shaft. It is also preferable that the ring gear of the second planetary gear set is connected to the planetary carrier of the third planetary gear set.

In an additional preferred form of the arrangement, the drive shaft is connected to the sun gear of the third planetary gear set. In addition, the drive shaft is preferably further connectable to the ring gear of the third planetary gear set through the third clutch. The ring gear of the first planetary gear set is further connected to a first spur pinion and the sun gear of the second planetary gear set, and the first spur pinion is connectable to the output shaft through the fourth clutch. A planetary carrier of the second planetary gear set is preferably connected to a second spur pinion, and such second spur pinion is connected to the output shaft, while the ring gear of the second planetary gear set is connectable to the planetary carrier of the third planetary gear set through the second clutch. Given the arrangement of the third clutch on the drive shaft and the fourth clutch on the output shaft, such shift elements are placed in such a manner that they can be easily reached from the outside, if necessary through the drive shaft and/or the output shaft.

In an additional preferred embodiment, the drive shaft is connected to the sun gear of the third planetary gear set. At the same time, such drive shaft is connectable to the ring gear of the third planetary gear set through the third clutch. The ring gear of the first planetary gear set features a connection with a first spur pinion, and the first spur pinion is connectable to the output shaft through the fourth clutch. At the same time, the ring gear of the first planetary gear set is connectable to the sun gear of the second planetary gear set through the second clutch. The planetary carrier of the second planetary gear set is connected to a second spur pinion, and such second spur pinion is connected to the output shaft, while the ring gear of the second planetary gear set is connected to the planetary carrier of the third planetary gear set.

In an additional preferred variant of the transmission, the drive shaft, on the one hand, is connected to the sun gear of the third planetary gear set and, on the other hand, is connectable to the ring gear of the third planetary gear set through the third clutch. In addition, the ring gear of the first planetary gear set is connected to a first spur pinion and the sun gear of the second planetary gear set, and the first spur pinion is connectable to the output shaft through the fourth clutch. The planetary carrier of the second planetary gear set is connectable to a second spur pinion through the second clutch, and the second spur pinion is further connected to the output shaft. The ring gear of the second planetary carrier is connected to the planetary carrier of the third planetary gear set.

In an additional preferred form of the arrangement of the transmission, the drive shaft, on the one hand, is connected to the sun gear of the third planetary gear set and, on the other hand, is connectable to the ring gear of the third planetary gear set through the third clutch. The ring gear of the first planetary gear set is connected to a first spur pinion and the sun gear of the second planetary gear set, and at the same time the first spur pinion is connectable to the output shaft through the fourth clutch. A second spur pinion, on the one hand, is connected to the planetary carrier of the second planetary gear set and, on the other hand, is connectable to the output shaft through the second clutch. The ring gear of the second planetary gear set is further connected to the planetary carrier of the third planetary gear set.

It is also preferable that, in the transmission, the drive shaft is connectable to the sun gear of the third planetary gear set through the second clutch, and at the same time to the ring gear of the third planetary gear set through the third clutch. The ring gear of the first planetary gear set is further connected to the sun gear of the second planetary gear set, and is connectable to a first spur pinion through the fourth clutch, while the first spur pinion is connected to the output shaft. Preferably, the planetary carrier of the second planetary gear set is connected to a second spur pinion, and such second spur pinion is further connected to the output shaft. The ring gear of the second planetary gear set is connected to the planetary carrier of the third planetary gear set.

Particularly preferably, the first forward gear can be shifted by the locked second brake, the locked first clutch and the locked second clutch. The second forward gear can be shifted by the locked first brake, the locked second brake and the locked second clutch. The third forward gear preferably can be shifted by the locked second brake, the locked second clutch and the locked fourth clutch. The fourth forward gear can be shifted by the locked first brake, the locked second clutch and the locked fourth clutch. The fifth forward gear preferably can be shifted by the locked first clutch, the locked second clutch and the locked fourth clutch. The sixth forward gear can be shifted by the locked second clutch, the locked third clutch, and the locked fourth clutch. The seventh forward gear preferably can be shifted by the locked first clutch, the locked second clutch and the locked third clutch. The eighth forward gear can be shifted by the locked first brake, the locked second clutch and the locked third clutch. The ninth forward gear preferably can be shifted by the locked first clutch, the locked third clutch and the locked fourth clutch. The tenth forward gear can be shifted by the locked first brake, the locked third clutch and the locked fourth clutch. The reverse gear can be shifted by the locked second brake, the locked first clutch and the locked fourth clutch. Thus, there can be a switch to the next gear solely by changing the shifting state of two shift elements. It is particularly preferable that this contributes to a reduction in shifting times. In particular preferably, the change to the shifting state is carried out to the effect that at least one of the previously open shift elements is locked and at least one of the previously locked shift elements is open.

In accordance with an additional aspect of the present invention, a method for operating the transmission is proposed. Thereby, in each gear, three shift elements are simultaneously locked. Regardless of whether they are able to be actuated hydraulically, electro-mechanically or in any other way, this leads to a lower need for energy of the shift elements, which ultimately has advantageous effects on consumption, for example the consumption of fuel if an internal combustion engine is the drive source of the vehicle.

BRIEF DESCRIPTION OF THE DRAWINGS

The invention is described more specifically by example on the basis of the attached figures. The following is shown:

FIG. 8 is an exemplary shift diagram for a transmission in accordance with FIGS. 1 to 7.

DETAILED DESCRIPTION

Figure 1:
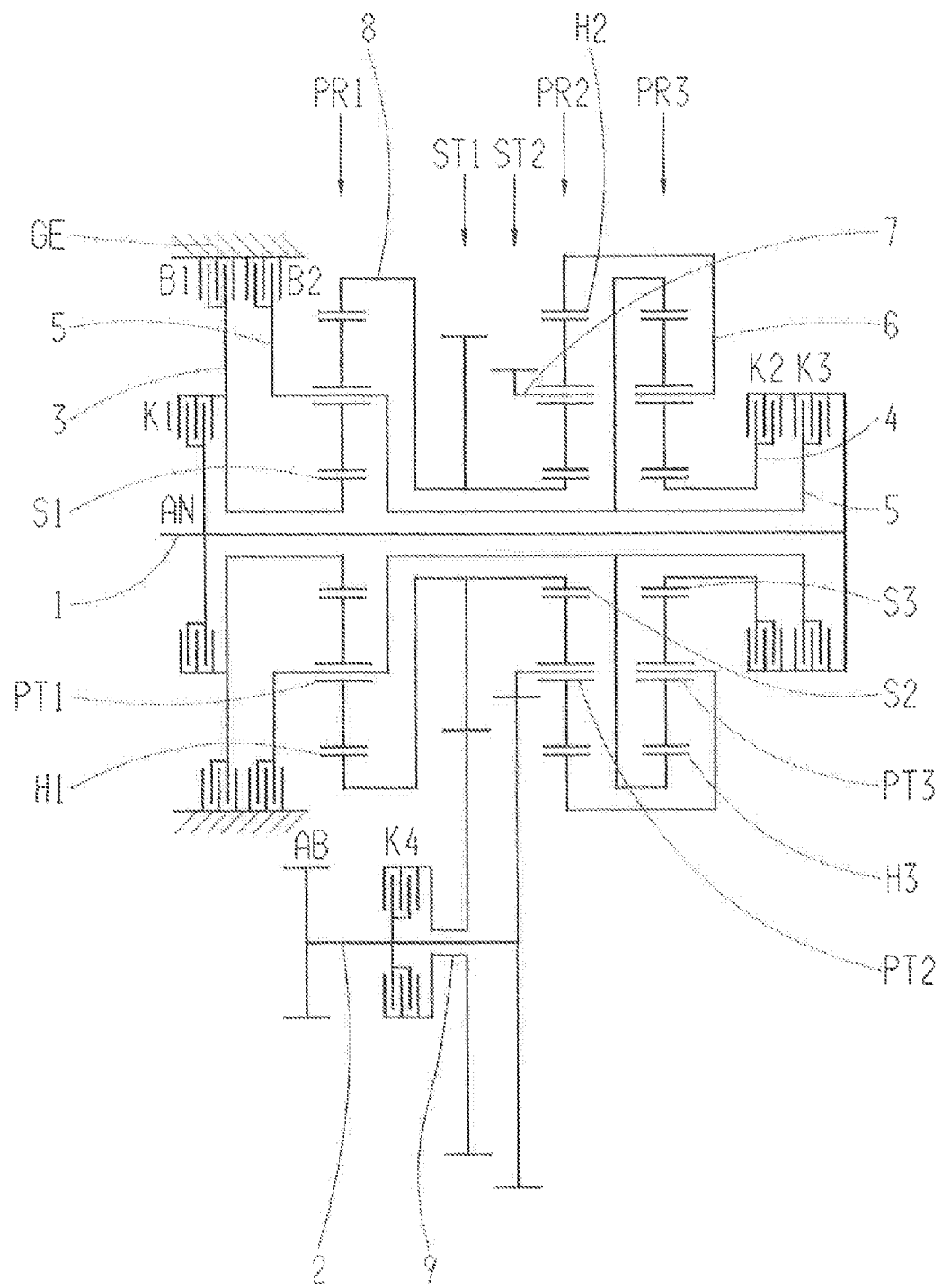
FIG. 1 is a schematic view of a first preferred embodiment of a transmission in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In a schematic presentation, FIG. 1 shows a first preferred embodiment of the transmission, whereas the transmission comprises a first planetary gear set PR1, a second planetary gear set PR2, a third planetary gear set PR3, a first spur pinion ST1, a second spur pinion ST2 and six shift elements, whereas all of the specified elements are arranged in a housing GE. The six shift elements comprise a first brake B1, a second brake B2, a first clutch K1, a second clutch K2, a third clutch K3 and a fourth clutch K4. The first brake B1 and the second brake B2 are firmly connected to the housing GE on one side. Through a drive shaft 1, a rotational movement or a torque is initiated in the transmission. The initiation of the torque or the rotational movement is carried out at one end of the drive shaft 1, which protrudes from the housing GE. Such end of the drive shaft 1 is arranged axially opposite to the second clutch K2 or third clutch K3. The elements of the transmission are arranged between the transmission input and the third clutch K3, axially along the drive shaft 1, in the order of first clutch K1, first brake B1, second brake B2, first planetary gear set PR1, first spur pinion ST1, second spur pinion ST2, second planetary gear set PR2, third planetary gear set PR3, second clutch K2. An output shaft 2 is arranged parallel to the drive shaft 1. The fourth clutch K4 is located between the first spur pinion ST1 and one end of the output shaft 2, which protrudes from the housing GE. The end of the drive shaft 1, which protrudes from the housing GE, and the end of the output shaft 2, which protrudes from the housing GE, point in the same direction.

The drive shaft 1 is connectable to a third shaft 3 through the first clutch K1, whereas the third shaft 3 at the same time connects the sun gear S1 of the first planetary gear set PR1 to the first brake B1 and thus the sun gear S1 of the first planetary gear set PR1 is able to be braked at the housing GE through the first brake B1. Furthermore, the drive shaft 1 is connectable to a fourth shaft 4 through the second clutch K2, whereas the fourth shaft 4 is in turn connected to the sun gear S3 of the third planetary gear set PR3. The drive shaft 1 is also connectable to a fifth shaft 5 through the third clutch K3, whereas the fifth shaft 5 is connected to the planetary carrier PT1 of the first planetary gear set PR1, and also features a connection to the ring gear H3 of the third planetary gear set PR3. In addition, the fifth shaft 5 connects the planetary carrier PT1 of the first planetary gear set PR1 to the second brake of B2; i.e., the fifth shaft 5 or the planetary carrier PT1 of the first planetary gear set PR1 is able to be braked at the housing GE by means of the second brake B2. A sixth shaft 6 connects the ring gear H2 of the second planetary gear set PR2 to the planetary carrier PT3 of the third planetary gear set PR3. A seventh shaft 7 connects the planetary carrier PT2 of the second planetary gear set PR2 to the second spur pinion ST2, by which a transfer of the rotational movement or the torque to the output shaft 2 is enabled. An eighth shaft 8 connects the ring gear H1 of the first planetary gear set PR1 is connected, on the one hand, to the first spur pinion ST1 and, on the other hand, to the sun gear S2 of the second planetary gear set PR2. A ninth shaft 9 is connectable to the output shaft 2 through the fourth clutch K4, whereas the ninth shaft 9 is in turn connected to the first spur pinion ST1.

The first planetary gear set PR1 is designed as a negative planetary gear set. This means that planetary gears of the planetary carrier PT1 mesh with the sun gear S1 and the ring gear H1 of the first planetary gear set PR1. The same applies to the second planetary gear set PR2 or the sun gear S2, the planetary carrier PT2 and the ring gear H2 of the second planetary gear set PR2, and the third planetary gear set PR3 or the sun gear S3, the planetary carrier PT3 and the ring gear H3 of the third planetary gear set PR3.

Figure 2:
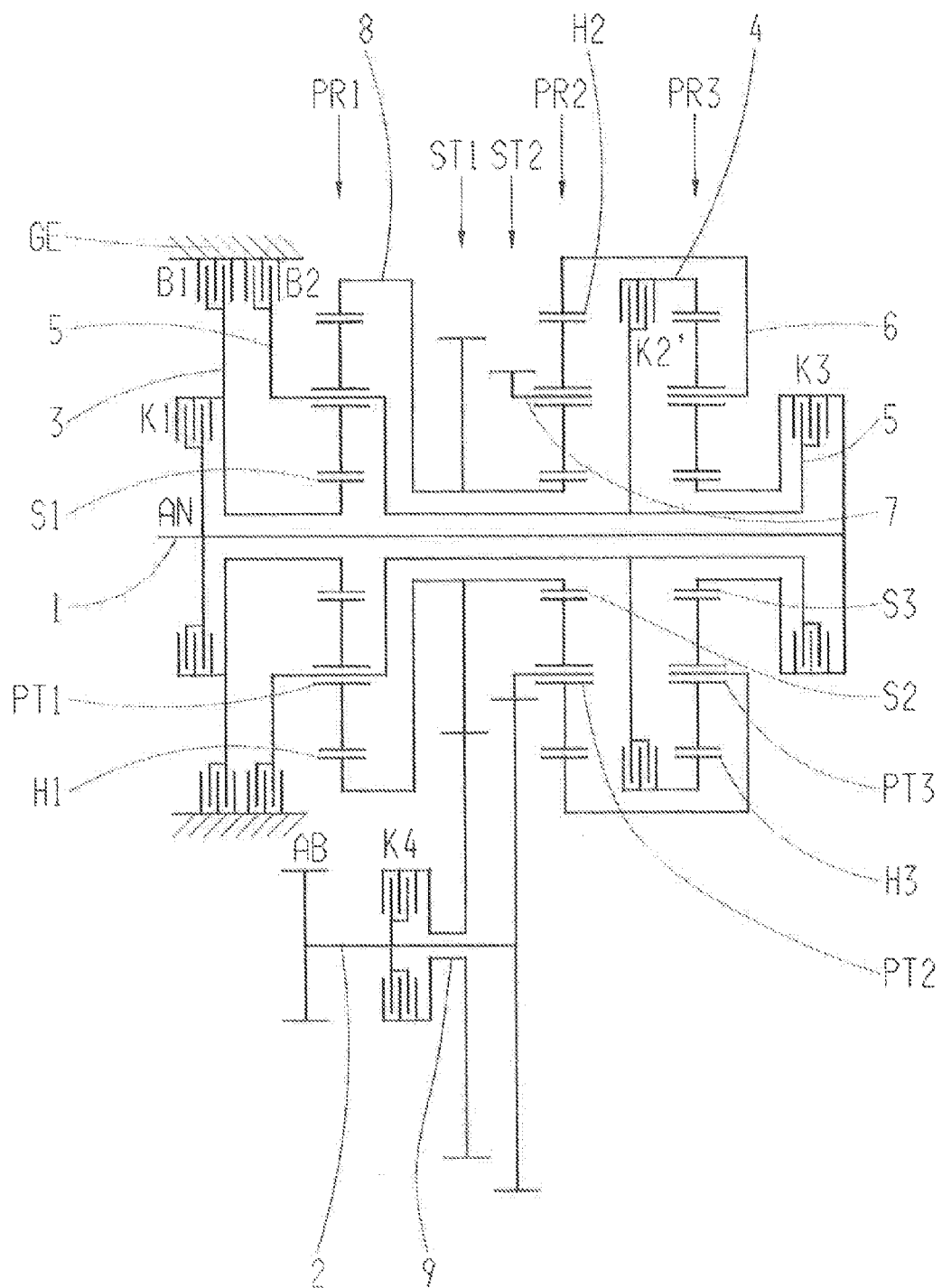
FIG. 2 is a schematic view of a second preferred embodiment of a transmission in accordance with the invention.

FIG. 2 shows an additional embodiment of the transmission described in FIG. 1, which differs from the embodiment described in FIG. 1 on the basis of two characteristics. On the one hand, the drive shaft 1 is directly connected to the sun gear S3 of the third planetary gear set PR3 and not, as in FIG. 1, connected to the sun gear S3 of the third planetary gear set PR3 through the second clutch K2 and the fourth shaft 4. On the other hand, there is no direct connection between the fifth shaft 5 and the ring gear H3 of the third planetary gear set PR3; rather, the fifth shaft 5 is connected to the fourth shaft 4 through the second clutch K2', and this is connected to the ring gear H3 of the third planetary gear set PR3. All additional connections and interfaces correspond to the arrangement described in FIG. 1.

Figure 3:
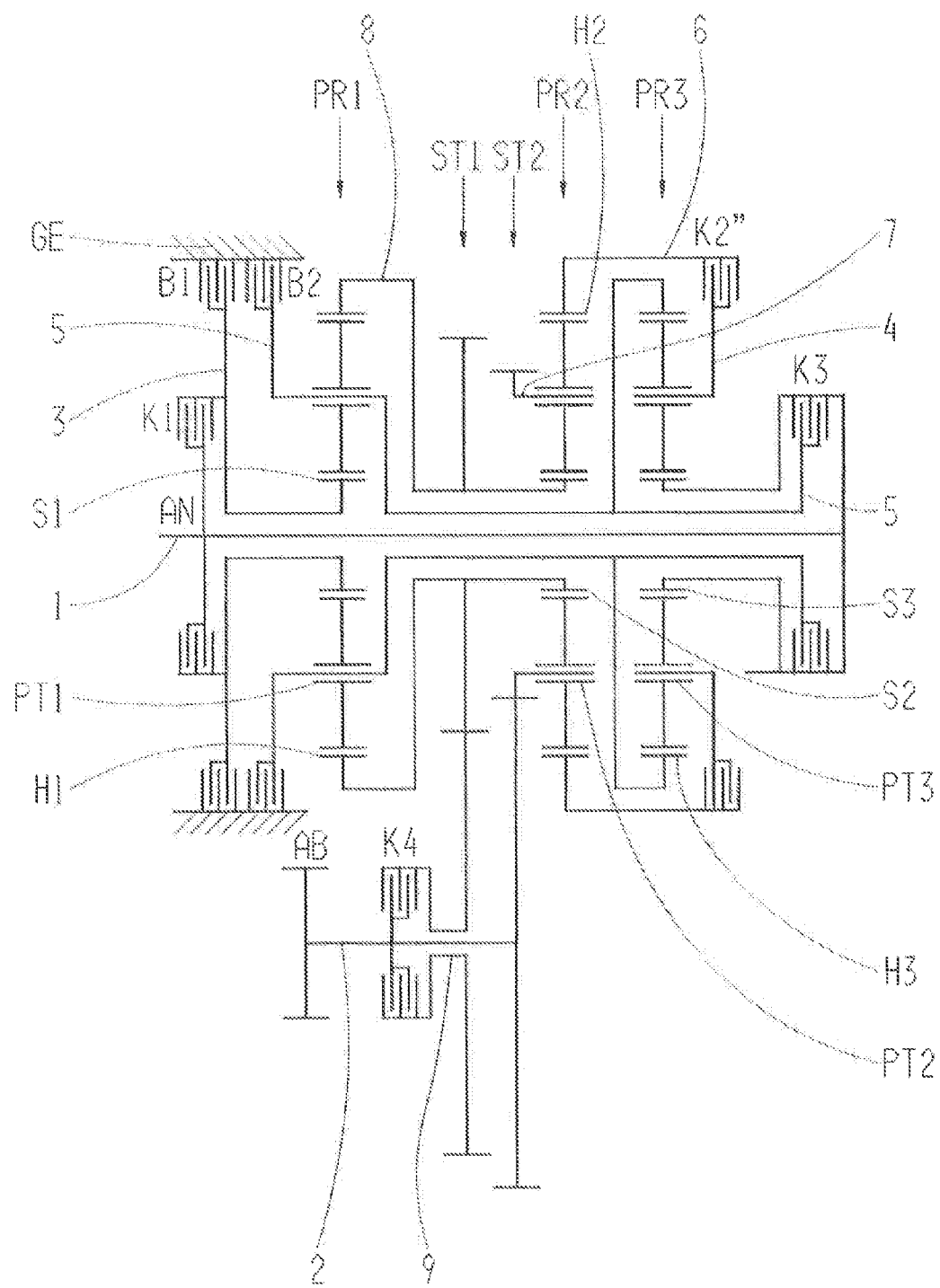
FIG. 3 is a schematic view of a third preferred embodiment of a transmission in accordance with the invention.

FIG. 3 shows an additional variant of the transmission described in FIG. 1. Thereby, the drive shaft 1 is connectable to the third shaft 3 through the first clutch K1, whereas the sun gear S1 of the first planetary gear set PR1 3 is connectable to the first brake B1 through the third shaft 3, or is able to be braked at the housing GE. At the same time, the drive shaft 1 is connected to the sun gear S3 of the third planetary gear set PR3. In addition, the drive shaft 1 is connectable to the fifth shaft 5 through the third clutch K3, whereas the fifth shaft 5 is connected, on the one hand, to the ring gear H3 of the third planetary gear set PR3 and, on the other hand, to the planetary carrier PT1 of the first planetary gear set PR1. In addition, the planetary carrier PT1 of the first planetary gear set PR1 is able to be braked at the housing GE through the fifth shaft 5 by means of the second brake B2. The ring gear H1 of the first planetary gear set PR1 is, as described in FIG. 1, connected by means of the eighth shaft 8, on the one hand, to the sun gear S2 of the second planetary gear set PR2 and, on the other hand, to the first spur pinion ST1. Thus, the eighth shaft 8 also connects the sun gear S2 of the second planetary gear set PR2 to the first spur pinion ST1. The first spur pinion ST1 is further connected to the ninth shaft 9, which in turn is connectable to the output shaft 2 through the fourth clutch K4. The planetary carrier PT2 of the second planetary gear set PR2 is connected to the second spur pinion ST2 through the seventh shaft 7. In addition, the second spur pinion ST2 is connected to the output shaft 2, and enables a transfer of the torque or the rotational movement to the output shaft 2. The sixth shaft is 6, on the one hand, is connected to the ring gear H2 of the second planetary gear set PR2 and, on the other hand, is connectable to the fourth shaft 4 through the second clutch K2". The fourth shaft 4 is in turn also connected to the planetary carrier PT3 of the third planetary gear set PR3.

Figure 4:
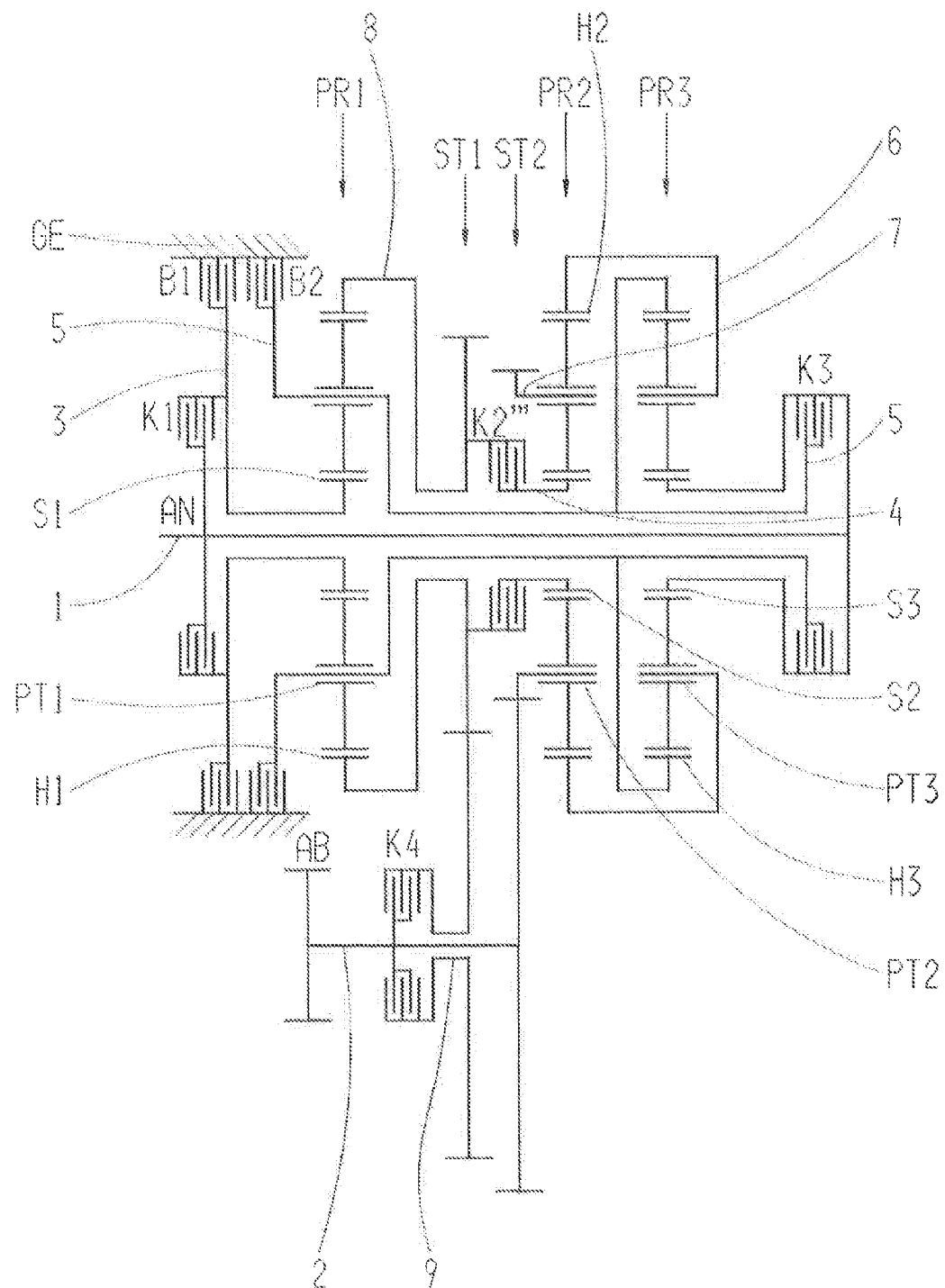
FIG. 4 is a schematic view of a fourth preferred embodiment of a transmission in accordance with the invention.

In FIG. 4, a fourth variant of the transmission described in FIG. 1 is schematically represented. The transmission corresponds to a large extent to the embodiment described in FIG. 3; only the arrangement of the second clutch K2''' and the fourth shaft 4 differs from the embodiment described in FIG. 3, as follows. The ring gear H1 of the first planetary gear set PR1 is connected to the first spur pinion ST1 through the eighth shaft 8. In addition, the eighth shaft 8 is connectable to the fourth shaft 4 through the second clutch K2''', whereas the fourth shaft 4 is also connected to the sun gear S2 of the second planetary gear set PR2. An additional difference when compared to the embodiment shown in FIG. 3 exists in the connection of the ring gear H2 of the second planetary gear set PR2 through the sixth shaft 6 to the planetary carrier PT3 of the third planetary gear set PR3.

Figure 5:
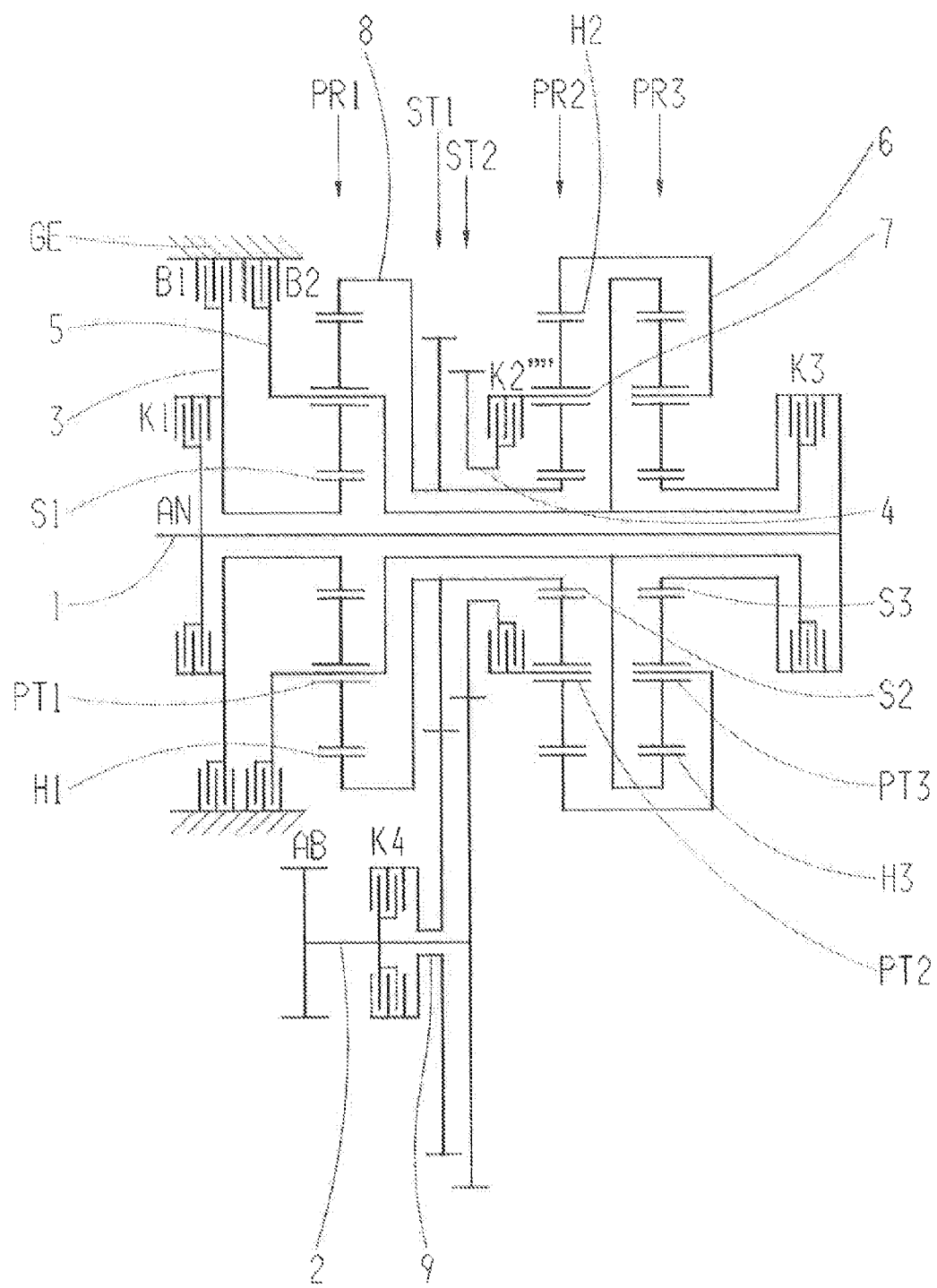
FIG. 5 is a schematic view of a fifth preferred embodiment of a transmission in accordance with the invention.

FIG. 5 shows a fifth variant of the transmission described in FIG. 1. Thereby, the transmission corresponds to a large extent to the embodiment described in FIG. 3. The differences between the two embodiments are reflected in the positioning of the second clutch K2'''' and the fourth shaft 4. The connection between the planetary carrier PT2 of the second planetary gear set PR2 and the second spur pinion ST2 does not take place, as described in FIG. 3, through the seventh shaft 7; rather, the planetary carrier PT2 of the second planetary gear set PR2 is connected to the seventh shaft 7, which is connectable to the fourth shaft 4 through the second clutch K2'''', and the fourth shaft 4 is in turn connected to the second spur pinion ST2, and the second spur pinion (ST2) transfers the torque or the rotational movement to the output shaft 2. The ring gear H2 of the second planetary gear set PR2 is connected to the planetary carrier PT3 of the third planetary gear set PR3 through the sixth shaft 6.

Figure 6:
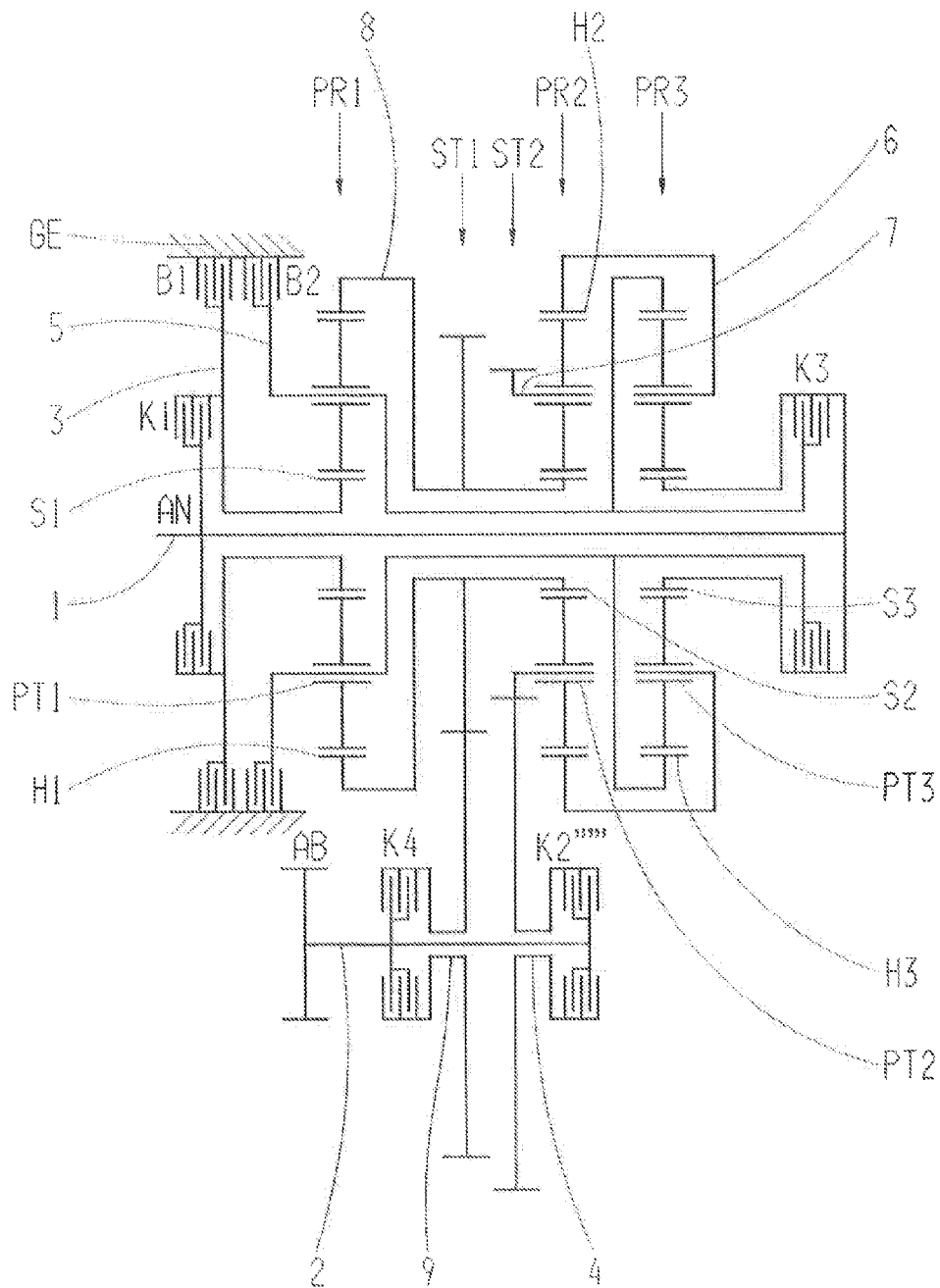
FIG. 6 is a schematic view of a sixth preferred embodiment of a transmission in accordance with the invention.

A sixth variant of the transmission described in FIG. 1 is shown in FIG. 6. This arrangement is largely the same as the embodiment described in FIG. 5. The only difference arises from the positioning of the second clutch K2''''' and the fourth shaft 4. This is reflected in the fact that the second spur pinion ST2 is connected to the fourth shaft 4, and the fourth shaft 4 is connectable to the output shaft 2 through the second clutch K2'''''. The planetary carrier PT2 of the second planetary gear set PR2 is connected to the second spur pinion ST2 through the seventh shaft 7. The other arrangement of the elements of the embodiment are the same as the arrangement described in FIG. 5.

Figure 7:
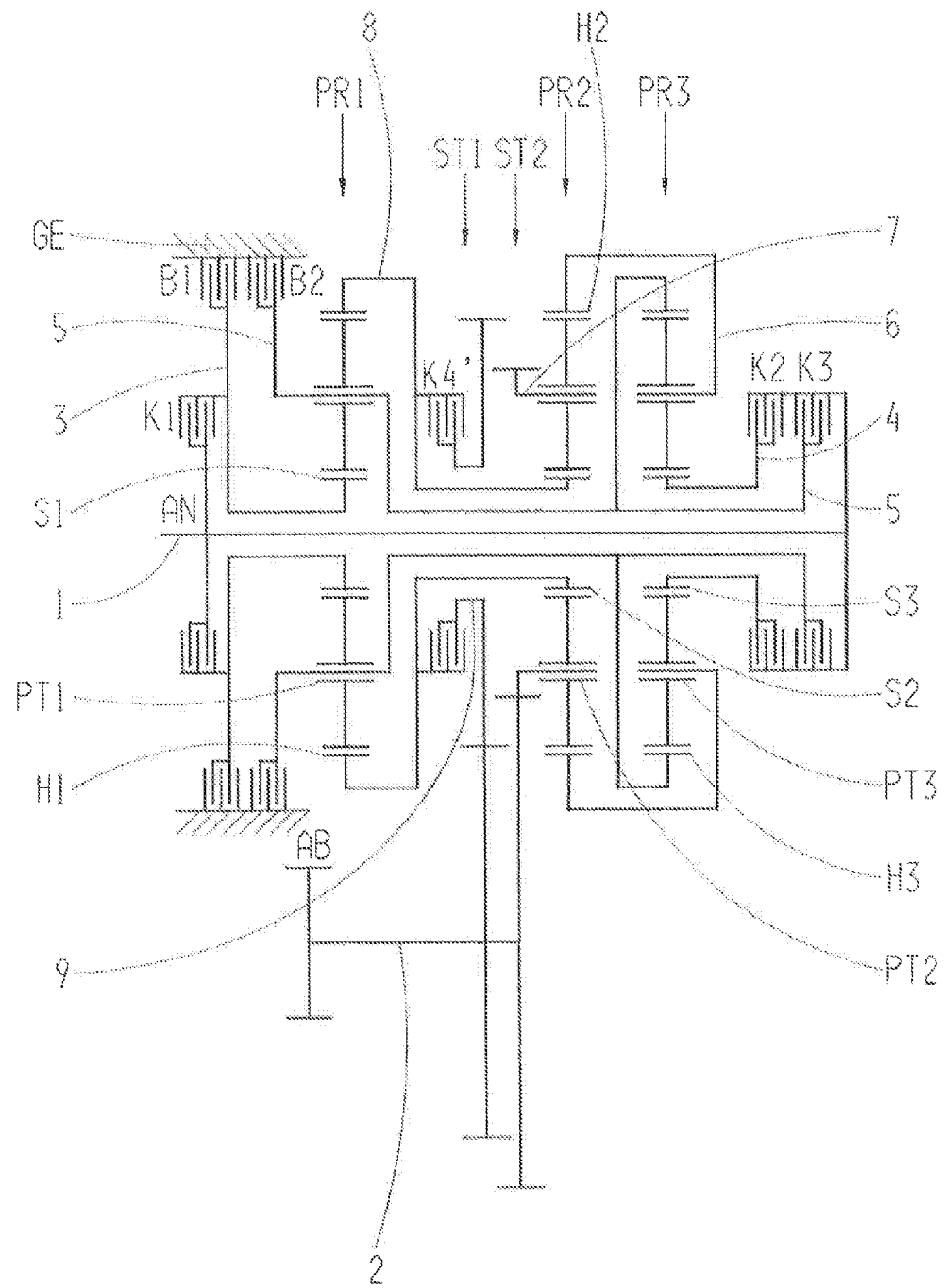
FIG. 7 is a schematic view of a seventh preferred embodiment of a transmission in accordance with the invention.

FIG. 7 shows a seventh variant of the transmission described in FIG. 1. Thereby, the drive shaft 1 is connectable to the third shaft 3 through the first clutch K1, whereas the third shaft 3 or the sun gear S1 of the first planetary gear set PR1 is able to be braked at the housing GE by means of the first brake B1. In addition, the drive shaft 1 is connectable to the fourth shaft 4 through the second clutch K2, whereas the fourth shaft 4 is connected to the sun gear S3 of the third planetary gear set PR3. Further, the drive shaft 1 is connectable to the fifth shaft 5 through the third clutch K3. The fifth shaft 5 also connects the ring gear H3 of the third planetary gear set PR3 to the planetary carrier PT1 of the first planetary gear set PR1. In addition, the planetary carrier PT1 of the first planetary gear set PR1 is further connectable to the second brake B2 through the fifth shaft 5, or is able to be braked at the housing GE. The ring gear H1 of the first planetary gear set PR1 is connected to the eighth shaft 8. In addition, the eighth shaft 8 is connected to the sun gear S2 of the second planetary gear set PR2, and is connectable to the ninth shaft 9 through the fourth clutch K4'. The ninth shaft 9 is also connected to the first spur pinion ST1, whereas the first spur pinion ST1 transfers the rotational movement or torque to the output shaft 2. The planetary carrier PT2 of the second planetary gear set PR2 is connected through the seventh shaft 7 to the second spur pinion ST2, which transfers the rotational movement or torque to the output shaft 2. The ring gear H2 of the second planetary gear set PR2 is connected to the planetary carrier PT3 of the third planetary gear set PR3 through the sixth shaft 6.

In a table, FIG. 8 shows a shifting matrix of the transmission. By means of an X in the corresponding box, the shift element that is locked for the realization of the first to tenth forward gear and the reverse gear is made clear. In addition, the transmission ratio relationship of the respective gear is specified, whereas the first forward gear features a transmission ratio relationship of i=5.831, the second forward gear features a transmission ratio relationship of i=2.284, the third forward gear features a transmission ratio relationship of i=2.827, the fourth forward gear features a transmission ratio relationship of i=1.926, the fifth forward gear features a transmission ratio relationship of i=1.474, the sixth forward gear features a transmission ratio relationship of i=1.131, the seventh forward gear features a transmission ratio relationship of i=1.000, the eighth forward gear features a transmission ratio relationship of i=0.918, the ninth forward gear features a transmission ratio relationship of i=0.755, the tenth forward gear features a transmission ratio relationship of i=0.601 and, given the reversal of direction of the rotary movement, the reverse gear features a negative transmission ratio relationship of i=−2.945. Here, "transmission ratio" and "transmission ratio relationship" are synonymous.

Modifications and variations can be made to the embodiments illustrated or described herein without departing from the scope and spirit of the invention as set forth in the appended claims.

The invention claimed is:

1. A transmission for a motor vehicles, the transmission comprising:
    a drive shaft (1);
    an output shaft (2);
    a housing (3);
    six shift elements in the form of a first brake (B1), a second brake (B2), a first clutch, a second clutch (K2, K2', K2'', K2''', K2'''', K2'''''), a third clutch (K3,) and a fourth clutch (K4, K4');
    a first planetary gear set (PR1), a second planetary gear set (PR2) and a third planetary gear set (PR3), whereas each planetary gear set comprises a sun gear, a planetary gear, a planetary carrier, and a ring gear;
    the shift elements are selectively actuated to provide ten forward gears and one reverse gear through different transmission ratio relationships between the drive shaft (1) and the output shaft (2);
    the drive shaft (1) and the output shaft (2) arranged in a manner axially offset to each other, wherein a torque is transferable to the output shaft (2) through a first spur pinion (ST1) or a second spur pinion (ST2); and
    the drive shaft (1) is connectable to a planetary carrier (PR1) of the first planetary gear set (PR1) through the third clutch (K3), and the planetary carrier (PT1) of the first planetary gear set (PR1) is connectable to the housing (GE) by means of the second brake (B2).

2. The transmission according to claim 1, wherein:
    (a) the drive shaft (1) is connectable to the sun gear (S3) of the third planetary gear set (PR3) through the second clutch (K2);

(b) the drive shaft (1) is connectable to the ring gear (H3) of the third planetary gear set (PR3) through the third clutch (K3);

(c) the ring gear (H1) of the first planetary gear set (PR1) is connected to the first spur pinion (ST1) and the sun gear (S2) of the second planetary gear set (PR2);

(d) the first spur pinion (ST1) is connectable to the output shaft (2) through the fourth clutch (K4);

(e) the planetary carrier (PT2) of the second planetary gear set (PR2) is connected to the second spur pinion (ST2), which is connected to the output shaft (2); and (f) the ring gear (H2) of the second planetary gear set (PR2) is connected to the planetary carrier (PT3) of the third planetary gear set (PR3).

3. The transmission according to claim 1, wherein:

(a) the drive shaft (1) is connected to the sun gear (S3) of the third planetary gear set (PR3);

(b) the drive shaft (1) is connectable to the ring gear (H3) of the third planetary gear set (PR3) through the second clutch (K2');

(c) the ring gear (H1) of the first planetary gear set (PR1) is connected to the first spur pinion (ST1) and the sun gear (S2) of the second planetary gear set (PR2);

(d) the first spur pinion (ST1) is connectable to the output shaft (2) through the fourth clutch (K4);

(e) the planetary carrier (PT2) of the second planetary gear set (PR2) is connected to the second spur pinion (ST2), which is connected to the output shaft (2); and (f) the ring gear (H2) of the second planetary gear set (PR2) is connected to the planetary carrier (PT3) of the third planetary gear set (PR3).

4. The transmission according to claim 1, wherein:

(a) the drive shaft (1) is connected to the sun gear (S3) of the third planetary gear set (PR3);

(b) the drive shaft (1) is connectable to the ring gear (H3) of the third planetary gear set (PR3) through the third clutch (K3);

(c) the ring gear (H1) of the first planetary gear set (PR1) is connected to the first spur pinion (ST1) and the sun gear (S2) of the second planetary gear set (PR2), whereas the first spur pinion (ST1) is connectable to the output shaft (2) through the fourth clutch (K4);

(d) the planetary carrier (PT2) of the second planetary gear set (PR2) is connected to the second spur pinion (ST2), and this is connected to the output shaft (2); and (e) the ring gear (H2) of the second planetary gear set (PR2) is connectable to the planetary carrier (PT3) of the third planetary gear set (PR3) through the second clutch (K2").

5. The transmission according to claim 1, wherein:

(a) the drive shaft (1) is connected to the sun gear (S3) of the third planetary gear set (PR3);

(b) the drive shaft (1) is connectable to the ring gear (H3) of the third planetary gear set (PR3) through the third clutch (K3);

(c) the ring gear (H1) of the first planetary gear set (PR1) is connected to the first spur pinion (ST1);

(d) the first spur pinion (ST1) is connectable to the output shaft (2) through the fourth clutch (K4);

(e) the ring gear (H1) of the first planetary gear set (PR1) is connectable to the sun gear (S2) of the second planetary gear set (PR2) through the second clutch (K2''');

(f) the planetary carrier (PT2) of the second planetary gear set (PR2) is connected to the second spur pinion (ST2), and the second spur pinion (ST2) is connected to the output shaft (2); and (g) the ring gear (H2) of the second planetary gear set (PR2) is connected to the planetary carrier (PT3) of the third planetary gear set (PR3).

6. The transmission according to claim 1, wherein:

(a) the drive shaft (1) is connected to the sun gear (S3) of the third planetary gear set (PR3);

(b) the drive shaft (1) is connectable to the ring gear (H3) of the third planetary gear set (PR3) through the third clutch (K3);

(c) the ring gear (H1) of the first planetary gear set (PR1) is connected to the first spur pinion (ST1) and the sun gear (S2) of the second planetary gear set (PR2);

(d) the first spur pinion (ST1) is connectable to the output shaft (2) through the fourth clutch (K4);

(e) the planetary carrier (PT2) of the second planetary gear set (PR2) is connectable to the second spur pinion (ST2) through the second clutch (K2'''');

(f) the second spur pinion (ST2) is connected to the output shaft (2); and (g) the ring gear (H2) of the second planetary carrier (PR2) is connected to the planetary carrier (PT3) of the third planetary gear set (PR3).

7. The transmission according to claim 1, wherein:

(a) the drive shaft (1) is connected to the sun gear (S3) of the third planetary gear set (PR3);

(b) the drive shaft (1) is connectable to the ring gear (H3) of the third planetary gear set (PR3) through the third clutch (K3);

(c) the ring gear (H1) of the first planetary gear set (PR1) is connected to the first spur pinion (ST1) and the sun gear (S2) of the second planetary gear set (PR2);

(d) the first spur pinion (ST1) is connectable to the output shaft (2) through the fourth clutch (K4);

(e) the planetary carrier (PT2) of the second planetary gear set (PR2) is connected to the second spur pinion (ST2);

(f) the second spur pinion (ST2) is connected to the output shaft (2) through the second clutch (K2''''); and (g) the ring gear (H2) of the second planetary gear set (PR2) is connected to the planetary carrier (PT3) of the third planetary gear set (PR3).

8. The transmission according to claim 1, wherein:

(a) the drive shaft (1) is connected to the sun gear (S3) of the third planetary gear set (PR3) through the second clutch (K2);

(b) the drive shaft (1) is connectable to the ring gear (H3) of the third planetary gear set (PR3) through the third clutch (K3);

(c) the ring gear (H1) of the first planetary gear set (PR1) is connected to the sun gear (S2) of the second planetary gear set (PR2) and is connectable to the first spur pinion (ST1) through the fourth clutch (K4');

(d) the first spur pinion (ST1) is connected to the output shaft (2);

(e) the planetary carrier (PT2) of the second planetary gear set (PR2) is connected to the second spur pinion (ST2), which is connected to the output shaft (2); and (f) the ring gear (H2) of the second planetary carrier (PR2) is connected to the planetary carrier (PT3) of the third planetary gear set (PR3).

9. A method for operating the transmission according to claim 1, comprising simultaneously locking three shift elements in each gear.

10. A transmission for a motor vehicles, the transmission comprising:

a drive shaft (1);

an output shaft (2);

a housing (3);
six shift elements in the form of a first brake (B1), a second brake (B2), a first clutch, a second clutch (K2, K2', K2", K2''', K2'''', K2'''''), a third clutch (K3,) and a fourth clutch (K4, K4');
a first planetary gear set (PR1), a second planetary gear set (PR2) and a third planetary gear set (PR3), whereas each planetary gear set comprises a sun gear, a planetary gear, a planetary carrier, and a ring gear;
the shift elements are selectively actuated to provide ten forward gears and one reverse gear through different transmission ratio relationships between the drive shaft (1) and the output shaft (2);
the drive shaft (1) and the output shaft (2) arranged in a manner axially offset to each other;
the drive shaft (1) is connectable to a planetary carrier (PR1) of the first planetary gear set (PR1) through the third clutch (K3), and the planetary carrier (PT1) of the first planetary gear set (PR1) is connectable to the housing (GE) by means of the second brake (B2); and
characterized in that the drive shaft (1) is connectable to the first brake (B1) and the sun gear (S1) of the first planetary gear set (PR1) by means of the first clutch (K1), and the sun gear (S1) of the first planetary gear set (PR1) is connectable to the housing (GE) by means of the first brake (B1).

11. A transmission for a motor vehicles, the transmission comprising:
a drive shaft (1);
an output shaft (2);
a housing (3);
six shift elements in the form of a first brake (B1), a second brake (B2), a first clutch, a second clutch (K2, K2', K2", K2''', K2'''', K2''''') a third clutch (K3,) and a fourth clutch (K4, K4');
a first planetary gear set (PR1), a second planetary gear set (PR2) and a third planetary gear set (PR3), whereas each planetary gear set comprises a sun gear, a planetary gear, a planetary carrier, and a ring gear;
the shift elements are selectively actuated to provide ten forward gears and one reverse gear through different transmission ratio relationships between the drive shaft (1) and the output shaft (2);
the drive shaft (1) and the output shaft (2) arranged in a manner axially offset to each other;
the drive shaft (1) is connectable to a planetary carrier (PR1) of the first planetary gear set (PR1) through the third clutch (K3), and the planetary carrier (PT1) of the first planetary gear set (PR1) is connectable to the housing (GE) by means of the second brake (B2); and wherein:
(a) the first forward gear is shifted by locking the second brake (B2), the first clutch (K1) and the second clutch (K2, K2', K2", K2''', K2'''', K2''''');
(b) the second forward gear is shifted by locking the first brake (B1), the second brake (B2) and the second clutch (K2, K2', K2", K2''', K2'''', K2''''');
(c) the third forward gear is shifted by locking the second brake (B2), the second clutch (K2, K2', K2", K2''', K2'''', K2''''') and the fourth clutch (K4, K4');
(d) the fourth forward gear is shifted by locking the first brake (B1), the second clutch (K2, K2', K2", K2''', K2'''', K2''''') and the fourth clutch (K4, K4');
(e) the fifth forward gear is shifted by locking the first clutch (K1), the second clutch (K2, K2', K2", K2''', K2'''', K2''''') and the fourth clutch (K4, K4');
(f) the sixth forward gear is shifted by locking the second clutch (K2, K2', K2", K2''', K2'''', K2'''''), the third clutch (K3), and the fourth clutch (K4, K4');
(g) the seventh forward gear is shifted by locking the first clutch (K1), the second clutch (K2, K2', K2", K2''', K2'''', K2''''') and the third clutch (K3);
(h) the eighth forward gear is shifted by locking the first brake (B1), the second clutch (K2, K2', K2", K2''', K2'''', K2''''') and the third clutch (K3);
(i) the ninth forward gear is shifted by locking the first clutch (K1), the third clutch (K3) and the fourth clutch (K4, K4');
(j) the tenth forward gear is shifted by locking the first brake (B1), the third clutch (K3) and the fourth clutch (K4, K4');
(k) the reverse gear is shifted by locking the second brake (B2), the first clutch (K1) and the fourth clutch (K4, K4').

* * * * *